United States Patent
Arold

(10) Patent No.: US 6,823,935 B1
(45) Date of Patent: Nov. 30, 2004

(54) HEATING OR AIR-CONDITIONING SYSTEM

(75) Inventor: Klaus Arold, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/289,382

(22) Filed: Apr. 12, 1999

(30) Foreign Application Priority Data

Apr. 11, 1998 (DE) .......................................... 198 16 329

(51) Int. Cl.⁷ ............................ F25B 29/00; B60H 1/00; B60H 3/00

(52) U.S. Cl. ...................... 165/202; 165/203; 165/270; 165/297; 165/42; 165/43; 165/103; 454/75; 237/12.3 A; 237/12.3 B

(58) Field of Search ................................. 237/2 A, 2 B, 237/5, 12.3 A, 12.3 B; 454/156, 75; 165/42, 43, 201, 202, 203, 270, 297, 103

(56) References Cited

U.S. PATENT DOCUMENTS

| | | | | |
|---|---|---|---|---|
| 3,881,546 A | * | 5/1975 | Otsuka et al. ................. | 165/42 |
| 4,828,018 A | * | 5/1989 | Hoffman ....................... | 165/42 |
| 5,529,112 A | | 6/1996 | King et al. .................... | 165/42 |
| 5,755,282 A | * | 5/1998 | Teshima et al. ............... | 165/42 |
| 5,878,806 A | * | 3/1999 | Denk et al. .................... | 165/42 |
| 6,009,934 A | * | 1/2000 | Sunaga et al. ................. | 165/43 |

FOREIGN PATENT DOCUMENTS

| | | | | |
|---|---|---|---|---|
| DE | 31 51 263 A1 | 7/1983 | | |
| DE | 35 26 518 C2 | 4/1986 | | |
| DE | 35 26 518 A1 | 4/1986 | | |
| EP | WO 97/22488 | 6/1997 | | |
| GB | 0 703 359 | 2/1954 | | |
| JP | 57-26010 | * | 2/1982 | |
| JP | 58-136813 | * | 9/1983 | |
| JP | 50-221714 | * | 12/1983 | ................... 165/43 |
| JP | 59-32512 | * | 2/1984 | ................... 475/75 |
| JP | 3-10922 | * | 1/1991 | ................. 165/203 |
| JP | 10-138735 | * | 5/1998 | ................. 165/203 |

OTHER PUBLICATIONS

Front page of EP 0 507 120 A2 including Figures 1 and a translated Abstract (Mar. 1992).

* cited by examiner

*Primary Examiner*—John K. Ford
(74) *Attorney, Agent, or Firm*—Crowell & Moring LLP

(57) ABSTRACT

A heating or air-conditioning system for vehicles, having a heat exchanger through which a heating medium flows and which is arranged in an air duct through which air can flow, at least one air mixing chamber which has a warm-air inflow opening and a cold-air inflow opening, at least one closing member controlling the opening cross-sections of the inflow openings, and a shut-off valve which is arranged in the inflow or outflow of the heating medium to the or from the heat exchanger. For reducing the flow resistance in all operating modes, particularly during maximal cooling, the warm-air inflow opening is arranged in the air flow behind the heat exchanger, and a control system controlling the closing member and the shut-off valve is designed such that, with the shutting-off of the warm-air inflow opening, it closes the shut-off valve and, after the closing of the shut-off valve, changes the closing member into an open position which completely opens up the warm-air inflow opening.

14 Claims, 2 Drawing Sheets

HEATING OR AIR-CONDITIONING SYSTEM

BACKGROUND AND SUMMARY OF THE INVENTION

This application claims the priority of 198 16 329.0-16, filed Apr. 11, 1998, the disclosure of which is expressly incorporated by reference herein.

The invention relates to a heating or air-conditioning system for vehicles, and more particularly, to a system for controlling the position of a closing member to control the flow of conditioned air.

In the case of a known heating or air-conditioning system for motor vehicles of this type, such as German Patent Document DE 31 51 263 A1, the warm-air inflow opening of an air mixing chamber is arranged on the side of the heat exchanger which is forward in the air current, on the heat exchanger air inlet surface. The cold-air inflow opening is arranged to be inclined thereto at approximately an acute angle larger than 60°. Both inflow openings are controlled by a single swivellably arranged air flap which, in one of the respective two swivelling end positions, alternately completely shuts off the cold-air inflow opening and the warm-air inflow opening. The control device for controlling the air flap and the shut-off valve has an operating lever which is non-rotatably disposed on the swivel shaft of the air flap, as well as a swivelling lever which is non-rotatably connected with the shaft of the stop valve of the shut-off valve. On the swivelling lever, a circularly bent sliding surface is constructed on which the operating lever slides with its free end, at the end of the sliding surface, a projection protruding over this sliding surface.

In this type of arrangement when the air flap is in one swivelling end position, in which it completely covers the cold-air inflow opening, the shut-off valve is open and the heating or air-conditioning system heats maximally. When the air flap is moved toward its other swivelling end position, which can take place either manually or by means of a motor, the cold-air inflow opening is increasingly opened and cold air is increasingly added to the warm air in the air mixing chamber until a desired mixed-air temperature is reached. When the air flap is swivelled, the free end of the operating lever slides along the circular-arc-shaped sliding surface without operating the swivelling lever. When the air flap is changed into the other swivelling end position, in which the warm air flow opening is completely shut off, shortly before this swivelling end position is reached, the operating lever impacts on a projection and displaces it, whereby the swivelling lever is swivelled and, as a result, the stop valve of the shut-off valve is rotated into the closing position. The shut-off valve is closed and the warm-air inflow opening is completely covered so that no more air can pass through the heat exchanger and the complete air flow reaches the air mixing chamber by way of the cold-air inflow opening. The heating or air-conditioning system is set to maximal cooling with fresh air or with fan air cooled by means of an evaporator. The described arrangement of the air flap in front of the air inlet surface of the heat exchanger requires either a large air duct cross-section in front of the head exchanger and thus a large-volume climatic box or results in an unfavorable flow against the heat exchanger and thus a high flow resistance in the flow duct during the heating operation.

In the case of another known air conditioner for motor vehicles as disclosed in German Patent Document DE 35 26 518 C2, the control system has a computer which controls a water operating device as well as an air flap arranged in front of the heat exchanger. The air flap is again designed such that, in one swivelling end position, it completely covers the cold-air inflow opening and, in another swivelling end position, it completely covers the warm-air inflow opening and thus the whole air passage surface of the heat exchanger. In the "maximal cooling" position of the air conditioner, in addition to the covering of the warm-air inflow opening, an additional flap is triggered such that a bypass around the air mixing chamber is opened and thus the air resistance in the flow duct is lowered.

It is an object of the invention to provide a heating or air-conditioning system of the above-described type, wherein the flow duct produces low flow resistance offers to the air flow in all operating modes and which permits a compact construction of the air guiding or climatic box accommodating the flow duct.

In the case of a heating or air-conditioning system of the type indicated in the attached claims, this object is achieved according to the invention wherein the warm-air inflow opening controlled by the closing member is arranged behind the heat exchanger. The control system is designed such that following closure of a shut-off valve, the control system changes the closing member into an open position to completely open the warm-air inflow opening.

The heating or air-conditioning system according to the invention has the advantage that, as the result of the arrangement of the warm-air inflow opening of the air mixing chamber behind the air outlet surface of the heat exchanger, a straight-line flow against and through the heat exchanger is achieved without any diversion or deflection of the air flow, so that the internal flow resistance of the system is low. In addition, in the maximum cooling operation, by opening up the warm-air inflow opening after the closing of the shut-off valve for the heating medium, the cold air is guided not only via the cold-air inflow opening but, in addition, also through the cold heat exchanger by way of the warm-air inflow opening. As a result, in this operating phase, wherein a very high air flow rate is desired, the inflow cross-section available for the flow into the air mixing chamber is considerably reduced, whereby the flow resistance is lowered. This reduces noise generation and the fan for producing the air flow can also be operated at low rotational speeds, which again results in a reduction of noise.

Advantageous embodiments of the heating or air-conditioning system according to the invention with expedient further developments of the invention are contained in the additional claims.

BRIEF DESCRIPTION OF THE DRAWINGS

In the following, the invention will be explained in detail by means of embodiments illustrated in the drawing.

DETAILED DESCRIPTION OF THE DRAWINGS

Figure 1:
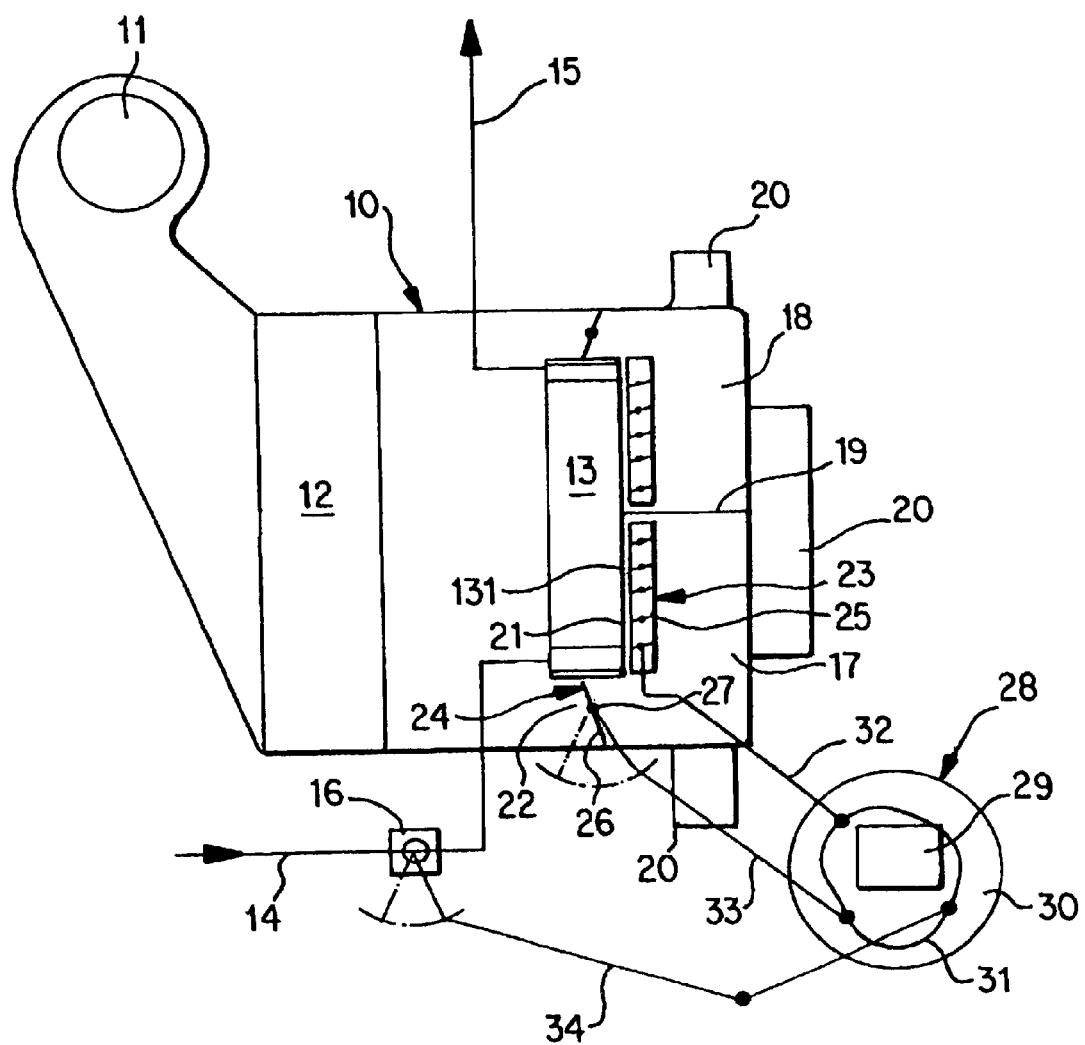
FIG. 1 is a schematic top view of a cross-section of a climatic box of a heating or air-conditioning system.

The climatic box 10 of a heating or air-conditioning system for a motor vehicle is schematically outlined in a sectional top view in FIG. 1. Climatic box 10 is connected in a known manner to a fan 11. Inside of climatic box 10, an evaporator 12, through which a refrigerant flows, and a heat exchanger 13 which is connected to the cooling water circulating system of the internal-combustion engine of the motor vehicle, are arranged one behind the other in the air flow direction. In FIG. 1, the cooling water inflow 14 is the inlet for cooling water to the heat exchanger 13 and the cooling water outflow 15 is the water out from the heat exchanger 13. In the cooling water inflow 14, a shut-off valve 16 for shutting off the cooling water circulation through the heat exchanger 13 is arranged which, as an alternative, may also be provided in the water outflow 15.

On the rear side of the heat exchanger 13, two air mixing chambers 17, 18 are arranged side-by-side and are separated from one another by a partition 19. Air mixing chambers 17, 18 are used for supplying air to the left and right side of the occupant compartment of the motor vehicle and, for this purpose, have corresponding air outlet connection pieces 20. The air mixing chambers 17, 18 have identical constructions and are equipped with the same elements for air control so that in the following, reference will be made only to the air mixing chamber 17, but the same statements also apply to the air mixing chamber 18.

The air mixing chamber 17 has a warm-air inflow opening 21 which is arranged behind the heat exchanger 13 and is tapped directly on the air outlet surface 131 of the heat exchanger 13. Air mixing chamber 17 has a cold-air inflow opening 22 which is arranged laterally of the heat exchanger 13 and by way of which the cold air which comes directly from the evaporator 12 and flows around the heat exchanger 13 can flow into the air mixing chamber 17. Each air inflow opening 21, 22 is provided with a closing member 23, 24 for controlling the opening cross-section of the respective inflow opening 21, 22. In the embodiment of FIG. 1, the closing member 23 for the warm-air inflow opening 21 is constructed as a space-saving shutter-type closure with a plurality of narrow swivel lamellae that are arranged side-by-side and, in their totality, are capable of covering the warm-air inflow opening 21. The closing member 24 for the cold-air inflow opening 22 is constructed as an air flap 26 which is disposed on a swivel shaft 27 rotatably disposed in the climatic box 10.

Figure 2:
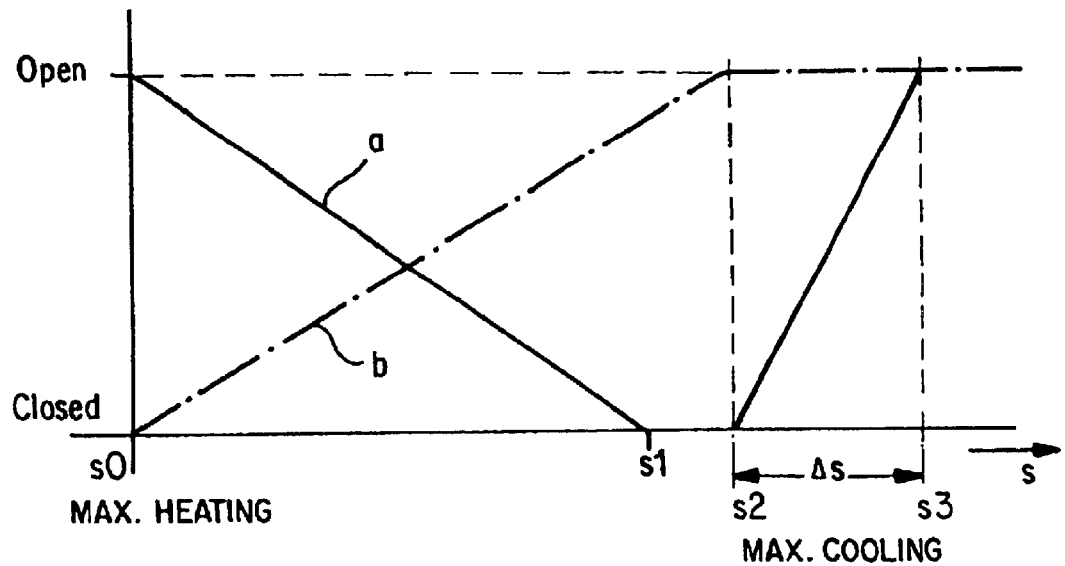
FIG. 2 is a diagram for adjusting the opening cross-section of the warm-air and cold-air inflow opening of an air mixing chamber in a climatic box according to FIG. 1 as a function of the adjusting path of a control system.

The two closing members 23, 24 and the shut-off valve 16 in the cooling water inflow 14 of the heat exchanger 13 are controlled by a control system 28 according to a characteristic curve, which is illustrated in FIG. 2. In this case, the opening cross-section of the two inflow openings 21, 22 is entered on the y-axis of the diagram "OPEN" indicates a completely open inflow opening 21, 22, and "CLOSED" indicates a closed inflow opening 21, 22. The adjusting path "s" of the control system 28 is illustrated on the x-axis. Curve "a" illustrated by a solid line indicates the characteristic control curve for the warm-air inflow opening 21. The dash-dotted curve "b" indicates the characteristic control curve for the cold-air inflow opening 22. In the initial position of the control system 28 (s0), the warm-air inflow opening 21 is completely open, and the cold-air inflow opening 22 is completely closed. The shut-off valve 16 is open, and, when the cooling water is heated, the heating or air-conditioning system is in the "maximal heating" operating mode. If the control unit 28 is now activated, with an increasing adjusting path s, the warm-air inflow opening 21 is continuously closed and the cold-air inflow opening 22 is continuously opened up. In the "maximal cooling" operating mode (adjusting path s2), the warm-air inflow opening 21 is completely closed and the cold-air inflow opening 22 is maximally opened. The heating or air-conditioning system is now in the "maximal cooling" mode. As illustrated in FIG. 2, the warm-air inflow opening 21 is already closed after the adjusting path s1 has been covered, thus in the case of an adjusting path, on which the cold-air inflow opening 22 is not yet fully opened.

In the adjusting range between s1 and s2, the control system 28 closes the shut-off valve 16 in the cooling water inflow 14 of the heat exchanger 13. When the control system 28 has reached its adjusting path s2, this is followed by a follow-up phase in which the control system 28 covers the adjusting path As. In this follow-up phase, the warm-air inflow opening 21 is completely opened up again. The warm-air inflow opening 21 reaches this condition in the case of the adjusting path s3.

Another opening-up of the warm-air inflow opening 21 has the advantage that, in the "maximal cooling" operating mode of the heating or air-conditioning system, in which a maximal air flow rate is desired for a fast cooling, the warm-air inflow opening 21 behind the switched-off heat exchanger 13 is additionally available as an air inflow opening and thus the flow resistance in the climatic box 10 is reduced. As the result of this cross-section, which is very large in the cooling operation, for ventilating the vehicle by way of the two air mixing chambers 17, 18, a low flow resistance of the climatic box is achieved, which, on the one hand, results in a lower generating of noise and, on the other hand, permits a lower rotational speed at the fan.

In the embodiment of FIG. 1, the control system 28 has a control disk 30 which is driven by an electric motor 29 and carries a control cam 31. Operating levers are coupled to the control cam 31, of which the operating lever 32 is applied to the closing member 23 for the warm-air inflow opening 21. The operating lever 33 is applied to the closing member 24 for the cold-air inflow opening 22 and the operating lever 34 is applied to the slide of the shut-off valve 16. The control cam 31 is constructed such that, when the control disk 30 is rotated, the closing members 23, 24 and the shut-off valve 16 are operated as described above in connection with the control diagram in FIG. 2 by way of the operating levers 32–34. In the embodiment of FIG. 1, the control cam 31 is constructed as a control groove in which the operating levers 32–34 engage by means of control pins. However, the control cam 31 may also be constructed as a cam track against which the ends of the operating levers 32–34 rest in a force-locking manner.

Figure 3:
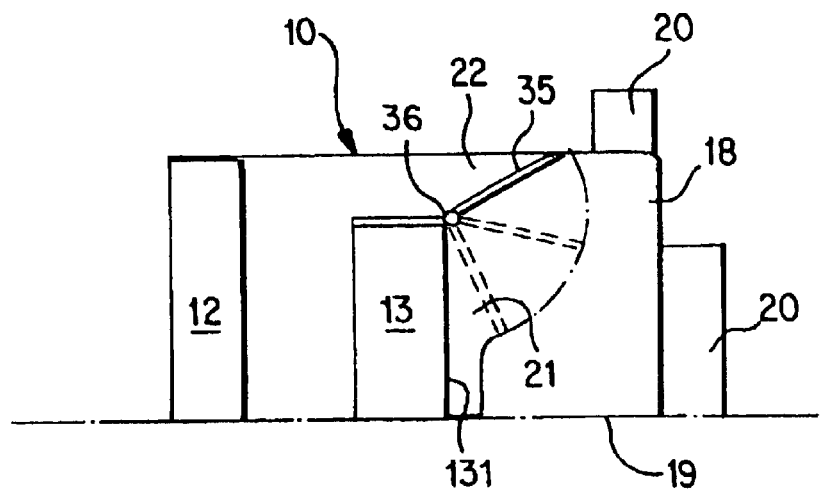
FIG. 3 is a schematic view of a cutout of the same representation as in FIG. 1 according to another embodiment.

In the case of the climatic box 10 according to a modified embodiment of the heating or air-conditioning system which is illustrated in FIG. 3 as a cut-out sectional top view, the warm-air inflow opening 21 and the cold-air inflow opening 22 of the air mixing chamber 17, 18 are controlled by a single closing member, in this case constructed as an air flap 35. The air flap 35 is constructed to be swivellable about a swivel axis 36 which extends along the rearward edge of the heat exchanger 13 and is fixed in the climatic box 10. The arrangement of the inflow openings 21, 22 is coordinated such with the swivelling range of the air flap 35 that, in one swivelling end position (illustrated by a solid line in FIG. 3), the air flap 35 completely closes the cold-air inflow opening 22 and, in the other swivelling end position (illustrated by a dash-dotted line in FIG. 3), completely closes the warm-air inflow opening 21. In addition, the air flap 35 also has a center position situated between the two swivelling end positions (shown by a broken line in FIG. 3), in which it maximally opens up both inflow openings 21, 22. The air flap 35 is coupled in the same manner to the control system 28 which controls the air flap 35 in connection with the shut-off valve 16 in the cooling water inflow 14 of the heat exchanger 13 according to the control diagram in FIG. 2 in the same manner as described above.

As an alternative to the above-described control system 28, electric servo motors can be provided for the closing members 23, 24 as well as for the slide of the shut-off valve 16, which electric servo motors are controlled by way of electric signal lines by an electronic control unit in the described manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Heating or air-conditioning system for vehicles, comprising:
    a heat exchanger through which a heating medium flows and which is arranged in an air duct through which air can flow;
    at least one air mixing chamber which has a warm air inflow opening for air flowing through the heat exchanger and a cold air inflow opening for air flowing around the heat exchanger;
    at least one closing member arranged downstream of the heat exchanger to control an opening cross-section of the warm air and cold air inflow openings of the air mixing chamber;
    a shut-off valve positioned in an inflow or outflow of the heating medium to or from the heat exchanger; and
    a control system for operating the at least one closing member and the shut-off valve, the control system being configured to close the shut-off valve when the warm air inflow opening is closed, wherein the warm-air inflow opening controlled by the at least one closing member is arranged downstream of the heat exchanger and the control system is configured to be operable such that, in a follow up phase following the closing of the shut-off valve, the closing member is returned to an open position which completely opens up the warm-air inflow opening.

2. Heating or air-conditioning system according to claim 1, wherein the closing member is constructed as an air flap which can be swivelled about a swivel axis, and the arrangement of the warm air and cold inflow openings in the air mixing chamber is such that, in one of two swivelling end positions of the air flap, the air flap alternately completely shuts off one of the warm air or cold air inflow openings and, in a swivelling position situated between the two swivelling end positions, maximally opens both the warm air and cold air inflow openings.

3. Heating or air-conditioning system according to claim 2, wherein, for separate ventilation of a left and right climatic zone in the vehicle, two air mixing chambers are provided, further wherein each of the two air mixing chambers has a warm air and cold air inflow openings and one air flap controlling the inflow openings.

4. Heating or air-conditioning system according to claim 1, wherein a separate closing member is assigned to each inflow opening.

5. Heating or air-conditioning system according to claim 4, wherein for separate ventilation of a left and a right climatic zone in the vehicle, two air mixing chambers are provided, further wherein each of the two air mixing chambers has a warm air and cold air inflow openings and a separate closing member controlling the inflow openings.

6. Heating or air-conditioning system according to claim 4, wherein the warm-air inflow opening is tapped directly on an air outlet surface of the heat exchanger and the at least one closing member controlling the warm-air inflow opening is each constructed as a shutter-type closure with a plurality of swivellable closing lamellae arranged side-by-side and which, in their plurality, are capable of covering the warm-air inflow opening.

7. Heating or air-conditioning system according to claim 4, wherein the at least one closing member controlling the cold-air inflow opening is constructed as a swivellable air flap.

8. Heating or air-conditioning system according to claim 1, wherein an electric servo motor is assigned to the shut-off valve and each closing member for their operation, and the servo motors are connected to the control system.

9. Heating or air-conditioning system according to claim 1, wherein the control system has a control disk operated by a motor, and an operating lever for the shut-off valve, and an operating lever for each closing member, each of the operating levers being coupled to a control cam constructed on the control disk.

10. Heating or air-conditioning system according to claim 5, wherein the warm-air inflow openings are tapped directly on an air outlet surface of the heat exchanger and the closing members controlling the warm-air inflow opening are each constructed as a shutter-type closure with a plurality of swivellable closing lamellae arranged side-by-side and which, in their plurality, are capable of covering the inflow opening.

11. Heating or air-conditioning system according to claim 5, wherein the closing members controlling the cold-air inflow openings are constructed as swivellable air flaps.

12. Heating or air-conditioning system according to claim 6, wherein the at least one closing member controlling the cold-air inflow opening is constructed as a swivellable air flap.

13. A ventilation system for a vehicle, comprising:
    a heat exchanger through which a heating medium flows, the heat exchanger being positioned in an air duct through which air flows;
    at least one air mixing chamber having a warm air inflow opening for air flowing through the heat exchanger and a cold air inflow opening for air flowing around the heat exchanger;
    at least one closing member arranged downstream of the heat exchanger to control an opening cross-section of the warm air and cold air inflow openings of the air mixing chamber,
    a shut-off valve at an inflow position or an outflow position to control the flow of the heating medium to or from the heat exchanger;
    a control system for operating the at least one closing member and the shut-off valve, the control system being configured to close the shut-off valve when the warm air inflow opening is closed, wherein the warm-air inflow opening is positioned downstream of the heat exchanger and the control system is configured to be operable such that, in a follow-up phase following closure of the shut-off valve, the closing member is completely re-opened for air flow therethrough.

14. A ventilation system for a vehicle, comprising:

a heat exchanger positioned in an air duct through which air flows;

a mixing chamber having a warm air inflow opening for air flowing through the heat exchanger, the warm-air inflow opening being positioned downstream of the heat exchanger, and a cold air inflow opening for air flowing around the heat exchanger;

a closing member arranged downstream of the heat exchanger to control an opening cross-section of the warm air and cold air inflow openings;

a shut-off valve to control the flow of the heating medium to or from the heat exchanger; and means for operating the closing member and the shut-off valve to (i) close the shut-off valve when the warm air inflow opening is closed and, in a follow-up phase following closure of the shut-off valve, (ii) completely re-open the closing member.

* * * * *